United States Patent
Kondo et al.

(10) Patent No.: US 7,599,091 B2
(45) Date of Patent: Oct. 6, 2009

(54) COLOR CONVERSION DEFINITION CREATION METHOD, COLOR CONVERSION DEFINITION CREATION APPARATUS AND COLOR CONVERSION DEFINITION CREATION PROGRAM STORAGE MEDIUM

(75) Inventors: Hirokazu Kondo, Kanagawa (JP); Taiji Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 689 days.

(21) Appl. No.: 11/147,319

(22) Filed: Jun. 8, 2005

(65) Prior Publication Data
US 2005/0275857 A1    Dec. 15, 2005

(30) Foreign Application Priority Data
Jun. 9, 2004    (JP)    ............... 2004-171424
Jul. 1, 2004     (JP)    ............... 2004-195483

(51) Int. Cl.
     *H04N 1/60*    (2006.01)
(52) U.S. Cl. ........................................ 358/1.9; 358/518
(58) Field of Classification Search .................. 358/1.9, 358/504, 518, 521, 525; 382/162, 167
See application file for complete search history.

(56) References Cited

U.S. PATENT DOCUMENTS

| | | | | |
|---|---|---|---|---|
| 5,809,213 A | * | 9/1998 | Bhattacharjya | ............... 358/1.6 |
| 6,181,445 B1 | * | 1/2001 | Lin et al. | ..................... 358/520 |
| 6,269,184 B1 | * | 7/2001 | Spaulding et al. | ........... 382/167 |
| 6,456,293 B1 | * | 9/2002 | Grandy | ........................ 345/591 |
| 6,735,334 B2 | * | 5/2004 | Roberts | ...................... 382/167 |

FOREIGN PATENT DOCUMENTS

| | | | |
|---|---|---|---|
| JP | 9-244158 A | | 8/1997 |
| JP | 09224158 A | * | 8/1997 |
| JP | 10-215386 A | | 8/1998 |
| JP | 11-187278 A | | 7/1999 |
| JP | 2003-289446 A | | 10/2003 |

* cited by examiner

*Primary Examiner*—Thomas D Lee
(74) *Attorney, Agent, or Firm*—Sughrue Mion, PLLC

(57) ABSTRACT

In creating color conversion definition in which correspondence relation between coordinates in a first color space and coordinates in a second color space is defined, high-accuracy color conversion definition is created in a method with a high degree of freedom of a known-point pair and with high versatility. By solving a formula in which, for any two coordinate points in a first color space, mutual relation between coordinates in a second color space corresponding to the coordinates is generally specified, with data of points for which mutual relationship has been determined as a boundary condition, and with arbitrarily set nonlinearity added, each coordinate in the second color space corresponding to each coordinate in the first color space is calculated.

12 Claims, 12 Drawing Sheets

COLOR CONVERSION DEFINITION CREATION METHOD, COLOR CONVERSION DEFINITION CREATION APPARATUS AND COLOR CONVERSION DEFINITION CREATION PROGRAM STORAGE MEDIUM

BACKGROUND OF THE INVENTION

1. Field of the Invention

The present invention relates a color conversion definition creation method for creating color conversion definition in which correspondence relation between coordinates in a first color space and coordinates in a second color space is defined, a color conversion definition creation apparatus for creating such color conversion definition, and a color conversion definition creation program storage medium storing a color conversion definition creation program for causing a computer to operate as such a color conversion definition creation apparatus.

2. Description of the Related Art

There are known various types of input devices for inputting an image to acquire image data, such as a color scanner for reading a recorded image to acquire image data and a DSC (digital still camera) for focusing an image of an object on a solid-state imaging device and reading it to acquire image data. In these input devices, image data is represented by data within a limited range, for example, a range from 0 to 255 for each of three colors of R (red), G (green) and B (blue). However, there is a natural limit to the number of colors which can be expressed by numeric values within a limited range for each of the three colors of R, G and B. Therefore, even if an original image is expressed in rich and varied colors, when the image is converted to image data by means of an input device, the colors of the image represented by the image data are limited to those within a region of color expression indicated by cubes or rectangular solid in the RGB color space.

There are also known various types of output devices for outputting an image based on image data, such as a photo printer which exposes the surface of printing paper to a laser light and develops the printing paper to record an image on the printing paper, a printer which records an image on paper in a method such as an electrophotography method and an ink jet method, a printing machine which creates a great deal of printed material by operating a rotary press, and an image display device such as a CRT display and a plasma display for displaying an image on a display screen based on image data. However, similarly to the input devices described above, there is a region of color expression corresponding to each of the output devices. That is, though an output device is capable of expressing various colors, for example, based on image data expressing three colors of R, G and B and image data expressing four colors of C (cyan), M (magenta), Y (yellow) and K (black), the colors which can be expressed by the output device are limited to colors within a region of color expression (for example, a region of color expression indicated by numerical values from 0 to 255 for each of R, G and B) indicated by cubes or a rectangular solid of the output device color space (for example, the RGB space, the CMYK space and the like).

Furthermore, the color of an image acquired based on particular image data (for example, data indicating (R, G, B)=(50, 100, 200)) differs depending on the kinds of output device. The same is true between an input device and an output device. Even if image data indicating (R, G, B)=(50, 100, 200), acquired by some input device is outputted as it is by some output device, the colors of the original image inputted by the input device and the image outputted by the output device are generally not the same. Therefore, in the case where image data is acquired by reading an image by means of some input device, and the original image is reproduced by means of some output device based on the image data, the image data acquired by the input should not be immediately sent to the output device but should be converted between the devices. In this case, the conversion is performed with regard to colors of the image, and this image data conversion is referred to as color conversion. Such as defines the mutual relation between the image data before and after the color conversion, for example, an LUT (look up table) is referred to as color conversion definition (a color profile), and creation of the color conversion definition (the color profile) is referred to as profiling.

As described above, the color expression region differs depending on devices, and image data of the same numerical value is expressed in a different color on each device. Recently, it has been desired to construct a device independent system in which an input device and an output device are mutually connected and can be freely replaced with a different device. Such a device independent system adopts a method in which, in performing color conversion between devices, a common color space independent from a device (space for device independent data), such as the L*a*B color space, is intermediately placed between the devices to perform color conversion of converting image data in a color space dependent on the input device, which has been acquired by the input device, to image data in the common color space, and color conversion of converting the image data in the common color space to image data in a color space dependent on the output device. In this device independent system, there are created a color profile which defines color conversion between the input device dependent color space and the common color space and a color profile which defines color conversion between the output device dependent color space and the common color space.

Generally, the color conversion definition (color profile) is created as a set of point pairs each of which is composed of a point in one of two color spaces and a point in the other. Table 1 below shows an example of the color conversion definition created as a set of point pairs.

TABLE 1

| RGB | L*a*b* |
| --- | --- |
| (0 0 0) | (7.0 0.6 0.2) |
| (0 0 10) | (8.8 0.8 5.8) |
| (0 0 20) | (8.8 0.9 8.1) |
| ... | ... |
| (255 255 255) | (90.5 0.2 −2.6) |

The color conversion definition shown in Table 1 defines color conversion between the RGB color space and the L*a*b* color space. In the left column of Table 1, points in the RGB color space are shown as coordinate values, and in the right column, points in the L*a*b* color space are shown as coordinate values. The points shown on the same row in the right and left columns correspond to each other. The points shown in the left column of Table 1 are intersection points between grid lines running at right angles to each other in the RGB color space. Such an intersection point is referred to as a grid point. The points shown in the right column of Table 1 are points irregularly distributed in the L*a*b* color space and corresponding to the grid points in the RGB color space. These points are referred to as corresponding grid points.

A practical color conversion definition is required to be created as a set of grid point pairs each of which is composed of a grid point in one of two color spaces between which color conversion is to be defined and a grid point in the other color space, as shown in Table 1. Description will be made on how color conversion is performed in accordance with the color conversion definition created as described above.

FIG. 1 is a conceptual diagram illustrating color conversion in accordance with color conversion definition.

In this conceptual diagram, grid points 1 in the RGB color space and corresponding grid points 2 in the L*a*b* color space are shown. There are also shown grid lines 3 in the RGB color space and curves 4 in the L*a*b* space corresponding to the grid lines. The correspondence relation between the grid points 1 and the grid points 2, and the correspondence relation between the grid lines 3 and the curves 4 can be derived from color conversion definition.

If image data for which color conversion is to be performed is image data indicating a grid point 1, the image data is naturally converted to image data indicating a grid point 2 corresponding to the grid point 1. If image data for which color conversion is to be performed is image data indicating a grid point 2, the image data is naturally converted to image data indicating a grid point 1 corresponding to the grid point 2.

If image data for which color conversion is to be performed is image data indicating a point 5 different from the grid points 1 in the RGB color space, calculations such as volume interpolation operation, triangular pyramid interpolation operation and polynomial approximation calculation are performed based on grid points 1a around the point 5 and corresponding grid points 2a each of which corresponds to each of the grid points 1a to determine a point 6 in the L*a*b* color space corresponding to the point 5 in the RGB color space, and image data indicating the point 5 is converted to image data indicating the point 6.

On the contrary, if image data for which color conversion is to be performed is image data indicating the point 6 in the L*a*b* color space, then such point 5 in the RGB color space that the calculation result of the volume interpolation operation and the like described above performed therefor is to be the point 6 is calculated with the use of convergence operation such as Newton method convergence operation and other convergence operations, and the image data indicating the point 6 is converted to image data indicating the point 5. However, actually in many cases, grid points in the L*a*b* color space are prepared prior to color conversion for each image data, and corresponding grid points in the RGB color space are calculated with the use of convergence operation such as the Newton method convergence operation to create reverse conversion definition which defines color conversion from the L*a*b* color space to the RGB color space in advance, and thereby, color conversion is performed with the use of volume interpolation operation and the like based on the reverse conversion profile.

Various profilings as shown below have been proposed as profiling in which color conversion definition (color profile) is created. In common profiling, by reading an image of a color chart with an input device, outputting it with an output device or measuring its colors with a colorimeter, data is prepared which indicates known-point pairs each of which is composed of a known point in a first color space (for example, the RGB color space) and a corresponding known point in a second color space (for example, the L*a*b* color space), and color conversion definition is created based on the data. In the description below, however, data indicating a known-point pair and a known-point pair may be used without distinction. Furthermore, for convenience of description, description will be made on the assumption that there is created color conversion definition which defines color conversion between the RGB color space and the L*a*b* color space.

In first profiling, the above-mentioned grid point pairs themselves as shown in Table 1 are acquired as known-point pairs to create color conversion definition as a set of the acquired grid points pairs. That is, it is necessary to prepare a color chart created so that grid point pairs themselves can be acquired by performing measurement and the like.

As an improvement of this first profiling, there has been proposed a method, wherein a color chart enabling acquisition of a part of necessary grid point pairs is prepared, and point pairs that cannot be acquired from the color chart are calculated by means of interpolation and the like based on the grid point pairs obtained from the color chart (see Japanese Patent Laid-Open No. 2003-289446).

In second profiling, color conversion definition is created, for example, based on a set of known points as shown in Table 2 below.

TABLE 2

| RGB | L*a*b* |
|---|---|
| (173 38 30) | (37.0 62.6 25.2) |
| (46 138 44) | (48.8 −48.1 35.2) |
| ... | ... |
| ... | ... |
| (215 189 20) | (74.6 7.0 100.6) |

In the left column of Table 2, coordinates of known points in the RGB color space are shown, and in the right column, coordinates of corresponding known points in the L*a*b* color space corresponding to the known points are shown. Both of the known points and the corresponding known points are irregularly distributed without regularity of the grid points described above.

Though color conversion definition is created based on the set of known-point pairs as shown in Table 2 in the second profiling, the second profiling requires the known-point pairs as shown in Table 2 to correspond to grid points in some third color space different from the RGB color space and the L*a*b* color space. The volume interpolation operation and the like described above are performed via the third color space, and a set of grid point pairs defining color conversion between the RGB color space and the L*a*b* color space is calculated, and thereby color conversion definition is created.

In third profiling, the correspondence relation between space coordinates in the RGB color space and space coordinates in the L*a*b* color space is approximated by the polynomial equation shown below.

$$\begin{bmatrix} L^* \\ a^* \\ b^* \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} R \\ G \\ B \\ 1 \end{bmatrix}$$ [Formula 1]

Then, by calculating the elements a11, a12, . . . , a33 and a34 of the coefficient matrix in this formula based on the set of known-point pairs as shown in Table 2, the correspondence relation between the space coordinates in the RGB color space and the space coordinates in the L*a*b* color space is calculated. Then, grid point pairs are calculated based on the coefficient matrix, the elements a11, a12, a 33 and a34 of which have been calculated, to create color conversion definition.

In fourth profiling, it is assumed that a physical model is satisfied which indicates the physical relation between light-emission luminance of a CRT and space coordinates in the RGB color space, as represented by the formula below.

$$Ry = a \cdot R^\gamma$$

$$Gy = a \cdot R^\gamma$$

$$By = a \cdot R^\gamma \qquad \text{[Formula 2]}$$

Then, with the use of the formula as shown below, which is derived from such a model, and the set of known-point pairs as shown in Table 2 described above, the correspondence relation between the space coordinates in the RGB color space and the space coordinates in the L*a*b* color space is calculated.

$$\begin{bmatrix} X \\ Y \\ Z \end{bmatrix} = \begin{bmatrix} a11 & a12 & a13 \\ a21 & a22 & a23 \\ a31 & a32 & a33 \end{bmatrix} \begin{bmatrix} Ry \\ Gy \\ By \end{bmatrix} \qquad \text{[Formula 3]}$$

By calculating the elements a11, a12, ..., a32 and a33 of the coefficient matrix in this formula, the correspondence relation between the space coordinates of the RGB color space and the space coordinates of the L*a*b* color space is calculated. Then, grid point pairs are calculated based on the coefficient matrix whose elements a11, a12, ..., a32 and a33 have been calculated, to create color conversion definition.

Though there have been proposed various profilings as described above, any of such conventional profilings has some disadvantages in addition to its advantages as described below.

When known-point pairs are prepared to create a profile, input/output or color measurement of a color chart is performed, and it is desirable that an existing chart in which patch rules are determined in advance or a chart in which patches of important colors are arranged with priority, such as an IT8 chart and Macbeth chart, can be used as the color chart. However, in the first and second profilings described above, it is impossible to use an existing chart in many cases.

Known-point pairs acquired by input/output or color measurement of the color chart indicate the most accurate correspondence relation between space coordinates in the RGB color space and space coordinates in the L*a*b* color space, and therefore, it is desirable to create color conversion definition to reproduce this correspondence relation. In the third profiling described above, however, the color conversion definition is created by approximation, and therefore there is a strong probability that the created color conversion definition may not reproduce the accurate correspondence relation indicated by the known-point pairs.

Furthermore, though it is desirable that profiling has high versatility to various devices, the fourth profiling described above is such that is applicable only to a device in which a physical model can be used, and it has little versatility to various devices.

SUMMARY OF THE INVENTION

The present invention has been made in view of the above circumstances and provides a color conversion definition creation method and a color conversion definition creation apparatus which have a high degree of freedom of a known-point pair to be a premise of conversion definition creation and high versatility to various devices and which are capable of creating high-accuracy color conversion definition, and a color conversion definition creation program storage medium storing a color conversion definition creation program which causes a computer to operate in a manner that it has a high degree of freedom of a known-point pair to be a premise of color conversion definition creation and high versatility to various devices and is capable of creating high-accuracy color conversion definition.

The present invention provides a color conversion definition creation method for creating color conversion definition in which correspondence relation between coordinates in a first color space and coordinates in a second color space is defined, the method including:

an acquisition step of acquiring a group of pairs of a coordinate in the first color space and a coordinate in the second color space;

a setting step of setting nonlinearity in the correspondence relation between the coordinates in the first color space and the coordinates in the second color space; and a calculation step of solving a formula in which, for any two coordinates in the first color space, mutual relation between coordinates in the second color space corresponding to the coordinates in the first color space is generally specified, with the group of coordinate pairs acquired by the acquisition step as a boundary condition and with the nonlinearity set by the setting step added, to calculate each coordinate in the second color space corresponding to each coordinate in the first color space.

According to the color conversion definition creation method of the present invention, a group of coordinate pairs acquired by the acquisition step is used as a boundary condition, and accordingly, it is possible to create a high-accuracy color conversion definition in which accurate correspondence relation indicated by a known-point pair acquired by input/output or color measurement of a color chart can be reproduced as it is. Furthermore, a formula in which mutual relation between coordinates is generally specified is used, and therefore, the degree of freedom in selection of a known-point pair as a boundary condition is high. Furthermore, the degree of freedom in selection of such a formula is high, and versatility is also high because a particular model is not required.

Preferably, in the color conversion definition creation method of the present invention:

"the first color space is a device color space dependent on a device mediating between image data and image;

the second color space is the XYZ color space of the CIEXYZ colorimetric system; and the calculation step is a step which adopts Laplace equation as the formula."

By adopting Laplace equation indicating an equilibrium condition in the field of the physical quantity, coordinates in the XYZ color space moderately change in response to change in coordinates in the device color space, and thereby color conversion definition can be obtained with which tone discontinuity in color conversion is avoided.

The present invention also provides a color conversion definition creation apparatus for creating color conversion definition in which correspondence relation between coordinates in a first color space and coordinates in a second color space is defined, the apparatus including:

an acquisition section which acquires a group of pairs of a coordinate in the first color space and a coordinate in the second color space;

a setting section which sets nonlinearity in the correspondence relation between the coordinates in the first color space and the coordinates in the second color space; and a calculation section which solves a formula in which, for any two coordinates in the first color space, mutual relation between coordinates in the second color space corresponding to the coordinates in the first color space is generally specified, with the group of coordinate pairs acquired by the acquisition section as a boundary condition and with the nonlinearity set by the setting section added, to calculate each coordinate in the second color space corresponding to each coordinate in the first color space.

According to the color conversion definition creation apparatus of the present invention, it is possible to create high-accuracy color conversion definition in a method with a high degree of freedom of known-point pairs and with high versatility, similarly to the color conversion definition creation method of the present invention described above.

The present invention also provides a color conversion definition creation program storage medium which stores a color conversion definition creation program to be incorporated in and executed by a computer, for causing the computer to create color conversion definition in which correspondence relation between coordinates in the first space and coordinates in the second space is defined, the program configuring, on the computer:

an acquisition section which acquires a group of pairs of a coordinate in the first color space and a coordinate in the second color space;

a setting section which sets nonlinearity for the correspondence relation between the coordinates in the first color space and the coordinates in the second color space; and a calculation section which solves a formula in which, for any two coordinates in the first color space, mutual relation between coordinates in the second color space corresponding to the coordinates in the first color space is generally specified, with the group of coordinate pairs acquired by the acquisition section as a boundary condition and with the nonlinearity set by the setting section added, to calculate each coordinate in the second color space corresponding to each coordinate in the first color space.

According to the color conversion definition program of the present invention, it is possible to easily construct components of the color conversion definition creation apparatus of the present invention.

Only basic forms of the color conversion definition creation program and the color conversion definition creation apparatus mentioned in the present invention are herein shown. This is simply for avoiding repetition. The color conversion definition creation program and the color conversion definition creation apparatus of the present invention are not limited to the basic forms, and various forms corresponding to each form of the color conversion definition creation methods described above are included.

As for components, such as an acquisition section, to be constructed on a computer by the color conversion definition creation program of the present invention, one component may be constructed by one program module, or one component may be constructed by multiple program modules. Alternatively, multiple components may be configured by one program module. Furthermore, such a component may be constructed so as to perform the operation itself, or may be constructed so as to instruct another program or program module incorporated in the computer to perform the operation.

As described above, according to the present invention, it is possible to create high-accuracy color conversion definition in a method with a high degree of freedom of a known-point pair and high versatility.

DETAILED DESCRIPTION OF THE INVENTION

Embodiments of the present invention will be described with reference to drawings.

Figure 1:
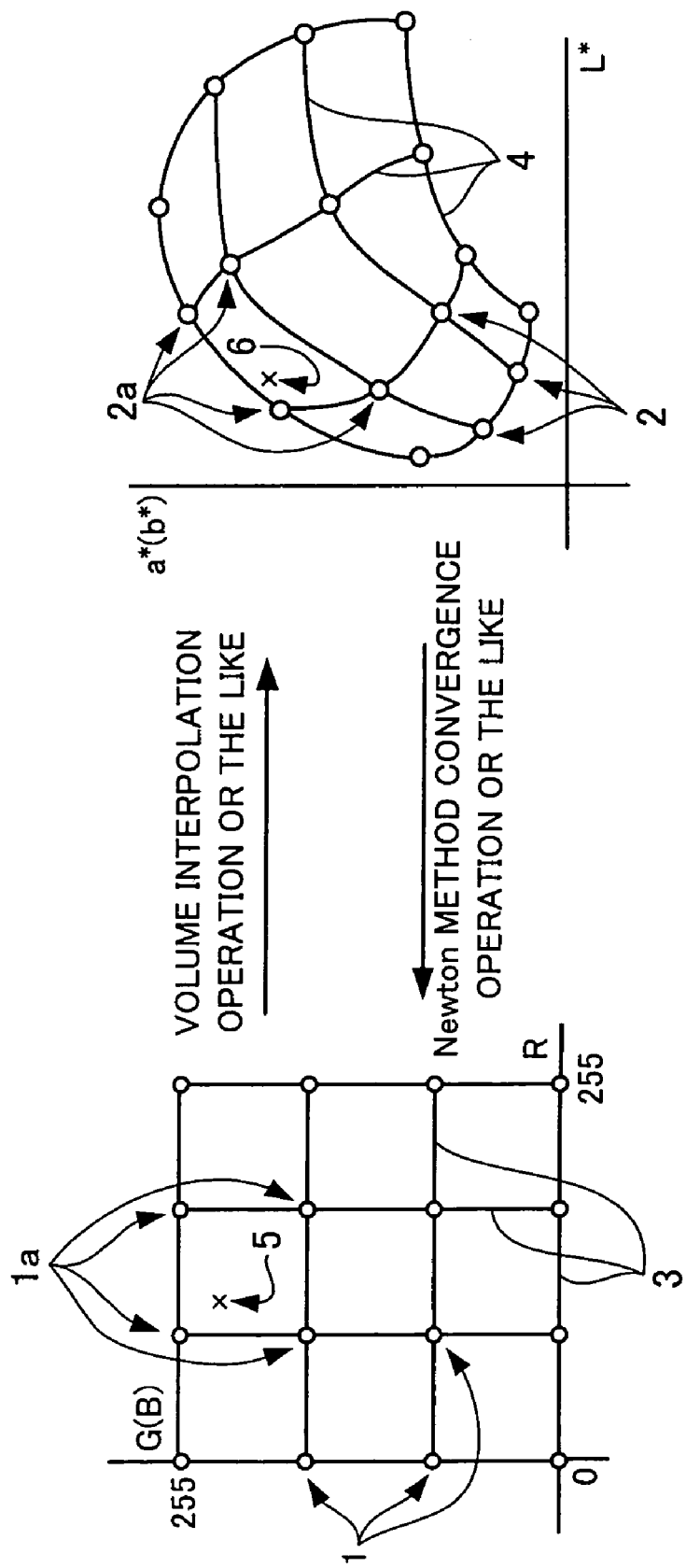
FIG. 1 is a conceptual diagram illustrating color conversion in accordance with color conversion definition.
Figure 2:
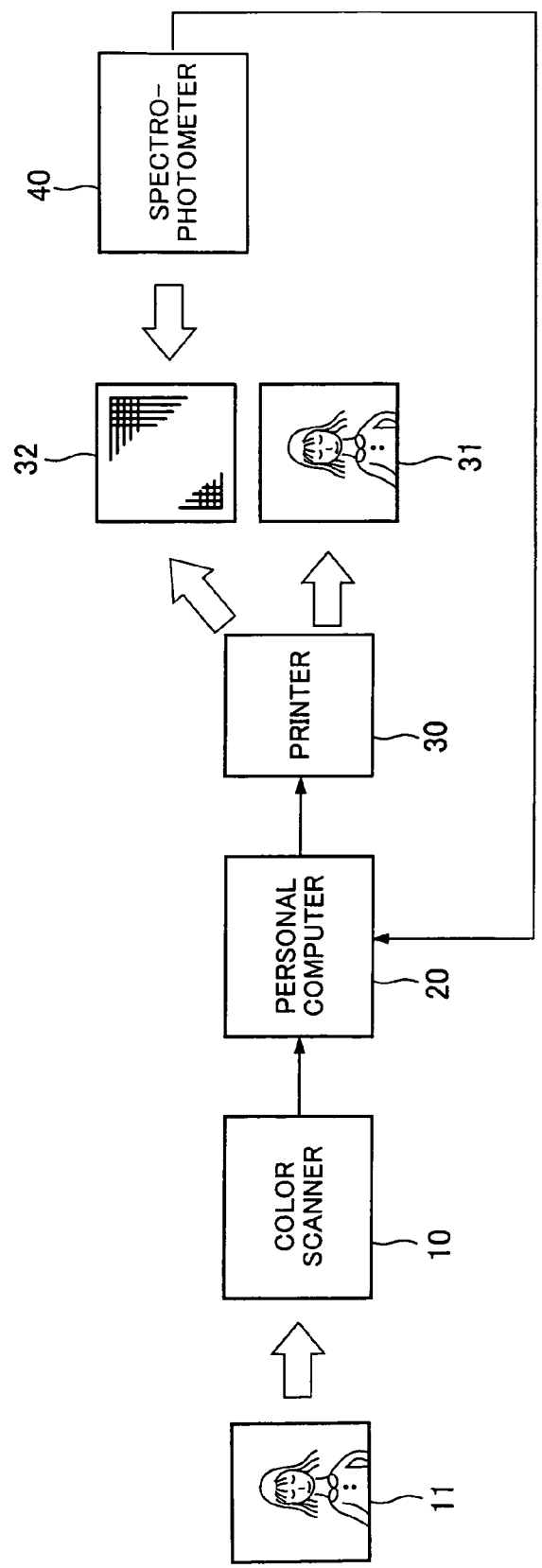
FIG. 2 is an entire block diagram of an image output system to which the present invention is applied.

FIG. 2 is an entire block diagram of an image output system to which the present invention is applied.

This image output system is configured by a personal computer 20 and a color printer 30, and a color scanner 10 which reads a source image 11 and generates image data is connected to the image output system. The personal computer 20 receives image data from the color scanner 10, converts it to image data for image output, suitable for the color printer 30, and outputs it. The color printer 30 outputs an image 31 in accordance with the image data.

In the personal computer 20, there are incorporated a function of creating the above-described profile (color conversion definition) and a function of performing color conversion in accordance with the profile in converting the image data. When creating a profile, the personal computer 20 outputs chart data indicating a chart 32 in which multiple patches are arranged, to the color printer 30.

The color printer 30 outputs the chart 32 in accordance with the chart data, and the colors of the patches constituting the chart 32 are measured by a spectrophotometer 40. The result of the measurement by the spectrophotometer 40 is inputted to the personal computer 20 and used for creation of a profile as described later.

The color scanner 10 is connected to the image output system shown in FIG. 2 as an example of an input device which generates image data corresponding to an image, and the color printer 30 is provided therewith as an example of an output device which outputs an image corresponding to image data. The color scanner 10 may be a transmission color scanner or a reflection color scanner, and is not limited to any reading method. The color printer 30 may be an electrophotography-method color printer or an ink-jet-method color printer, and is not limited to any printing method.

Furthermore, the input device is not limited to a scanner and may be a digital still camera. The output device is not limited to a printer and may be a printing machine. Furthermore, to the image output system, equipment other than an input device, such as a computer graphics creation apparatus, may be connected. Here, description will be made on the assumption of an image output system with the color scanner 10 connected as an input device and with the color printer 30 provided as an example of an output device.

When an embodiment of the present invention is applied to the image output system shown in FIG. 2, it is applied to the personal computer 20. Therefore, the personal computer 20 will be described below.

Figure 3:
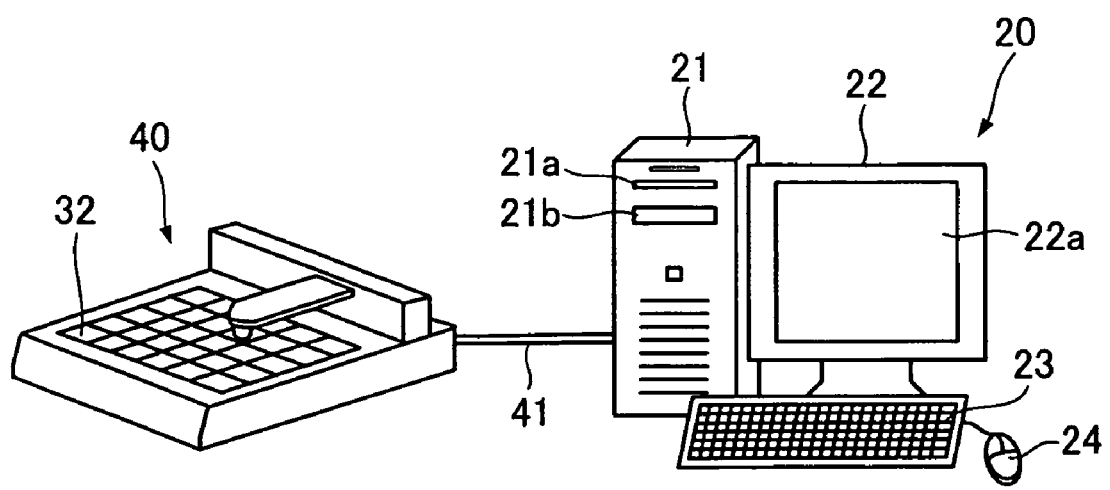
FIG. 3 shows external perspective views of a spectrophotometer and a personal computer.
Figure 4:
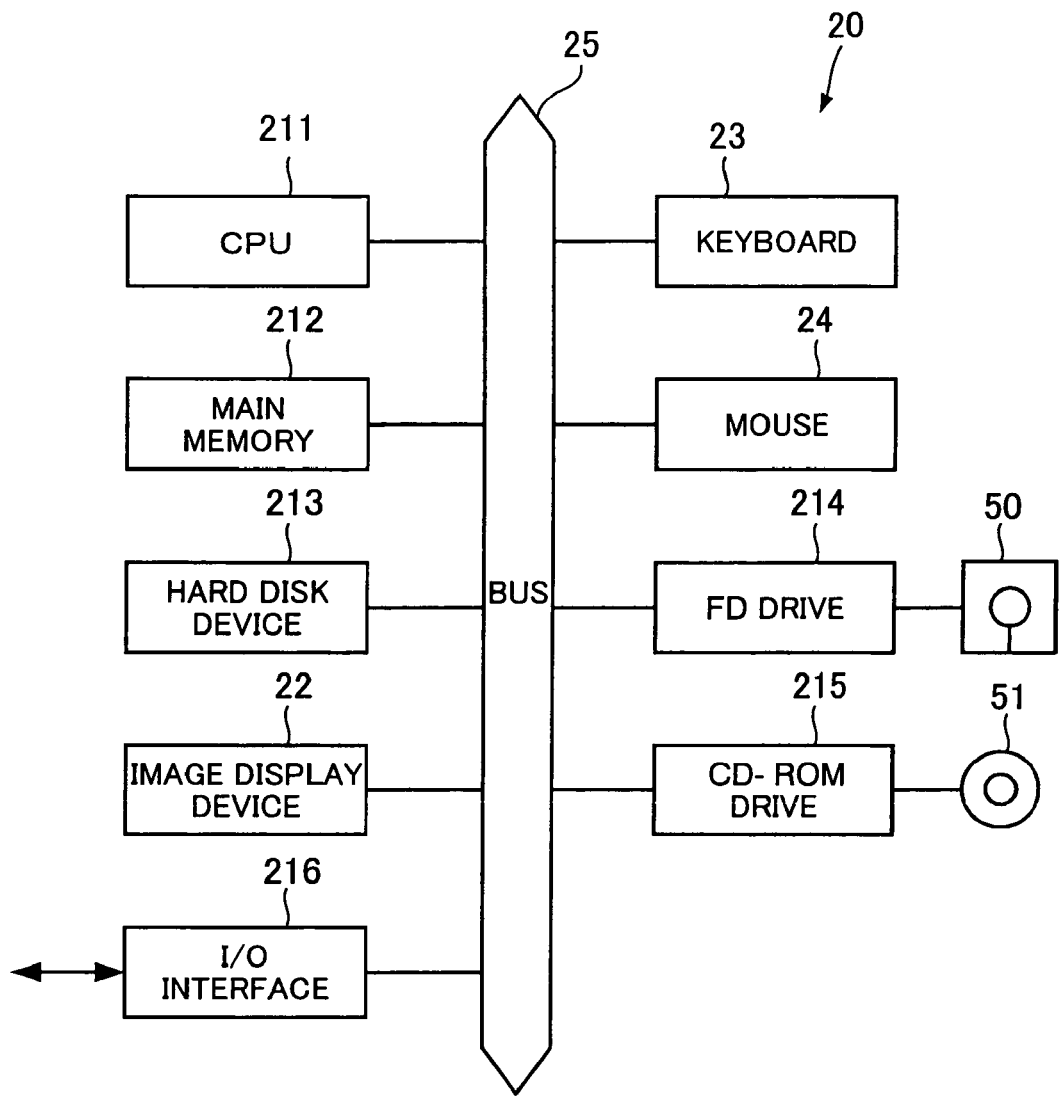
FIG. 4 shows the hardware configuration of the personal computer.

FIG. 3 shows external perspective views of the spectrophotometer 40 and the personal computer 20, and FIG. 4 shows the hardware configuration of the personal computer 20.

The chart 32 is placed on the spectrophotometer 40 shown in FIG. 3 by an operator. There are arranged multiple patches on the chart 32, and a colorimetric value is measured by the spectrophotometer 40 for each of the patches. The colorimetric value of each patch obtained by measurement by the spectrophotometer 40 is inputted to the personal computer 20 via a cable 41.

The chart 32 is created by print output by the color printer 30 shown in FIG. 2, and in the personal computer 20, a profile is created based on the measured value of each patch of the chart 32. Detailed description of creation of a profile will be made later. Here, the hardware configuration of the personal computer 20 will be described.

In appearance, the personal computer 20 is provided with a main unit 21, an image display device 22 for displaying an image on a display screen 22a in response to an instruction from the main unit 21, a keyboard 23 for inputting various information corresponding to key operations to the main unit 21, and a mouse 24 for specifying an arbitrary position on the display screen 22a to input an instruction corresponding to an icon and the like displayed at the position. In appearance, the personal computer 20 is provided with an FD slot 21a into which a flexible disk (FD) is to be inserted and a CD-ROM slot 21b into which a CD-ROM is to be inserted.

As shown in FIG. 4, in the main unit 21, there are included a CPU 211 for executing various programs, a main memory 212 to which a program stored in a hard disk device 213 is read and on which the program is developed to be executed by the CPU 211, the hard disk device 213 in which various programs and data are stored, an FD drive 214 in which a flexible disk 50 is to be mounted and which accesses the mounted flexible disk 50, a CD-ROM drive 215 in which a CD-ROM 51 is to be mounted and which accesses the mounted CD-ROM 51, and an input/output interface 216 which receives colorimetric data from the spectrophotometer 40 (see FIGS. 2 and 3) and sends image data to the color printer 30 (see FIG. 2). Furthermore, these various components are mutually connected to the image display device 22, the keyboard 23 and the mouse 24, which are also shown in FIG. 3, via a bus 25

In this case, an example of the color conversion definition creation program of the present invention is stored in the CD-ROM 51. The CD-ROM 51 is mounted in the CD-ROM drive 215, and the color conversion definition creation program stored in the CD-ROM 51 is uploaded to the personal computer 20 and stored in the hard disk device 213. Then, by the color conversion definition creation program being activated and executed, the personal computer 20 shown in FIGS. 2 to 4 operates as an embodiment of a color conversion definition apparatus of the present invention, and an embodiment of a color conversion definition creation method of the present invention is performed by the personal computer 20.

Description will be made on the assumption that the function of performing color conversion for image data is already incorporated in the personal computer 20.

Now, the concept of a profile and a basic method of creating a profile will be described. The basic creation method described here corresponds to the first profiling described in the section of the "Background of the Invention".

First, a scanner profile will be described.

Figure 5:
FIG. 5 is a conceptual diagram of a scanner profile.

FIG. 5 is a conceptual diagram of a scanner profile.

CMY values of image data defined by coordinates in the CMY color space (CMY values: an example of coordinates in a first color space according to the present invention) are inputted in this scanner profile T. The CMY values are converted to XYZ values of image data defined by coordinates in the XYZ color space (XYZ values: an example of coordinates in a second color space according to the present invention).

The scanner profile is assumed here to have been already created by the manufacturer of the scanner and delivered with the scanner, and therefore, it is not necessary to newly create a scanner profile. However, description will be made below on a basic creation method on the assumption that a scanner profile is newly created.

In the color scanner 10 shown in FIG. 2, a predetermined color chart including a series of color patches with density gradually changing is read to acquire CMY values corresponding to the respective color patches. Though the source image 11 shown in FIG. 2 is not an image indicating a color chart, it is assumed that a color chart has been read instead of the source image 11. Color measurement is performed for each of the color patches constituting the color chart by the spectrophotometer 40 to acquire XYZ values. By associating the CMY values and the XYZ values acquired in this way with each other, the scanner profile T indicating color conversion between the CMY color space and the XYZ color space is constructed.

A printer profile will be now described.

Figure 6:
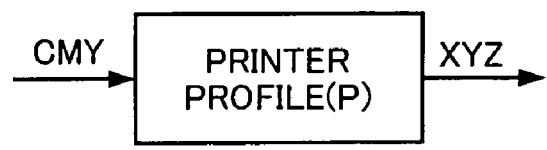
FIG. 6 is a conceptual diagram of a printer profile.

FIG. 6 is a conceptual diagram of a printer profile.

CMY values of image data defined by the CMY values are inputted in the printer profile, and the printer profile includes a forward conversion profile P for converting the CMY values to the XYZ values described above and a reverse conversion profile $p^{-1}$ for performing reverse conversion, that is, for converting the XYZ values to the CMY values.

A basic method of creating the forward conversion profile P will be described below. First, CMY values corresponding to a series of coordinate points arranged at regular intervals in the CMY color space are generated by the personal computer 20 shown in FIG. 2. The CMY values are sent to the color printer 30, and the color printer 30 print-outputs a chart 32 based on the CMY values.

Then, color measurement is performed by the spectrophotometer 40 for each of color patches constituting the outputted color chart 32 to acquire XYZ values. By associating the acquired XYZ values with the above-mentioned CMY values, a forward conversion profile P indicating color conversion between the CMY color space and the XYZ color space is constructed for the color printer 30.

The reverse conversion profile $p^{-1}$ is constructed by determining CMY values corresponding to XYZ values corresponding to a series of coordinate points arranged at regular intervals in the XYZ color space based on the forward conversion profile P.

Though the color printer 30 is described here on the assumption that it outputs an image based on the CMY values, a printer which outputs an image based on dot % data of CMYK, for example, can similarly create a printer profile suitable for the printer by the personal computer 20 generating data defined in the CMYK space to output a color chart. However, description here is continued on the assumption that the color printer 30 which outputs an image based on the CMY values is used.

When color conversion is performed with the use of a profile created as described above, a scanner profile T and a printer profile are combined for performing the color conversion.

Figure 7:
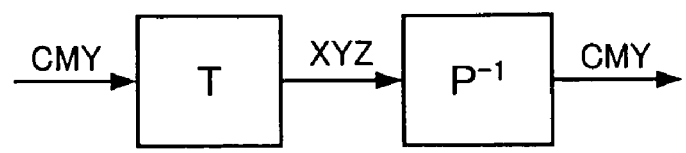
FIG. 7 shows the concept of color conversion in which a scanner profile and a printer profile are used in combination.

FIG. 7 shows the concept of color conversion in which a scanner profile and a printer profile are used in combination.

FIG. 7 shows color conversion to be performed by the personal computer 20, which is required by the image output system shown in FIG. 2. In this color conversion, CMY values defining image data for the color scanner 10 are converted to XYZ values by a scanner profile T, and then the XYZ values are converted to CMY values defining image data for the printer by a reverse conversion profile $p^{-1}$. Thus, an image 31 is outputted by the color printer 30 based on the image data for the printer which is defined by the converted CMY values, and thereby the image 31 with the same colors as those of the source image 11 read by the color scanner 10 can be obtained.

In the two-staged conversion via XYZ values described above, the calculation speed is low. Accordingly, in the personal computer 20 shown in FIG. 2, a combined profile constituted by combination of the scanner profile T and the reverse conversion profile $p^{-1}$ is created in advance, and color conversion is performed in accordance with this combined profile.

The basic creation method described above has the problems as described in the paragraph of "Description of the Related Art" though it is basic. Therefore, specific content of an embodiment of the present invention will be now described below. The description will be made on the creation of a printer profile described above as an example.

Figure 8:
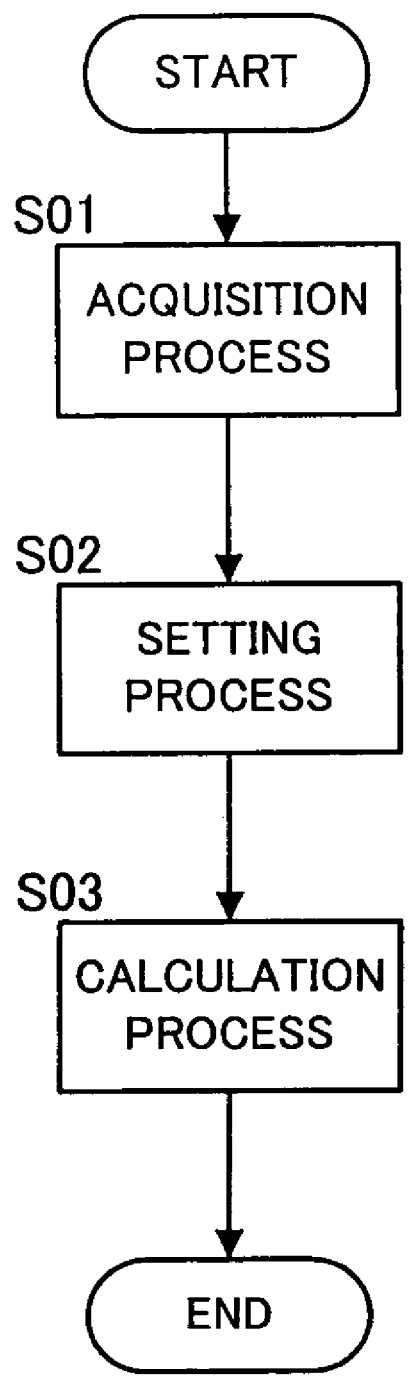
FIG. 8 is a flowchart showing an embodiment of a color conversion definition creation method of the present invention.

FIG. 8 is a flowchart showing an embodiment of a color conversion definition creation method of the present invention.

This color conversion definition creation method includes an acquisition process (step S01), a setting process (step S02) and a calculation process (step S03).

The acquisition process is a process of acquiring pairs of a CMY value and an XYZ value to be obtained by output and measurement of the chart 32 shown in FIGS. 2 and 3, and corresponds to an example of an acquisition step in a color conversion definition creation method of the present invention.

The setting process is a process of setting nonlinearity between the CMY color space and the XYZ color space, which is to be described later, and corresponds to an example of a setting step of a color conversion definition creation method of the present invention.

The calculation process is a process of calculating a corresponding grid point in the XYZ color space for each of grid points in the CMY color space. In this process, a corresponding grid point is calculated by solving an equation to be described later, with a pair of a CMY value and an XYZ value acquired by the acquisition process as a boundary condition, and under the nonlinearity set in the setting process. This calculation process corresponds to an example of a calculation step in a color conversion definition creation method of the present invention.

The detailed content of each step will be described later.

Figure 9:
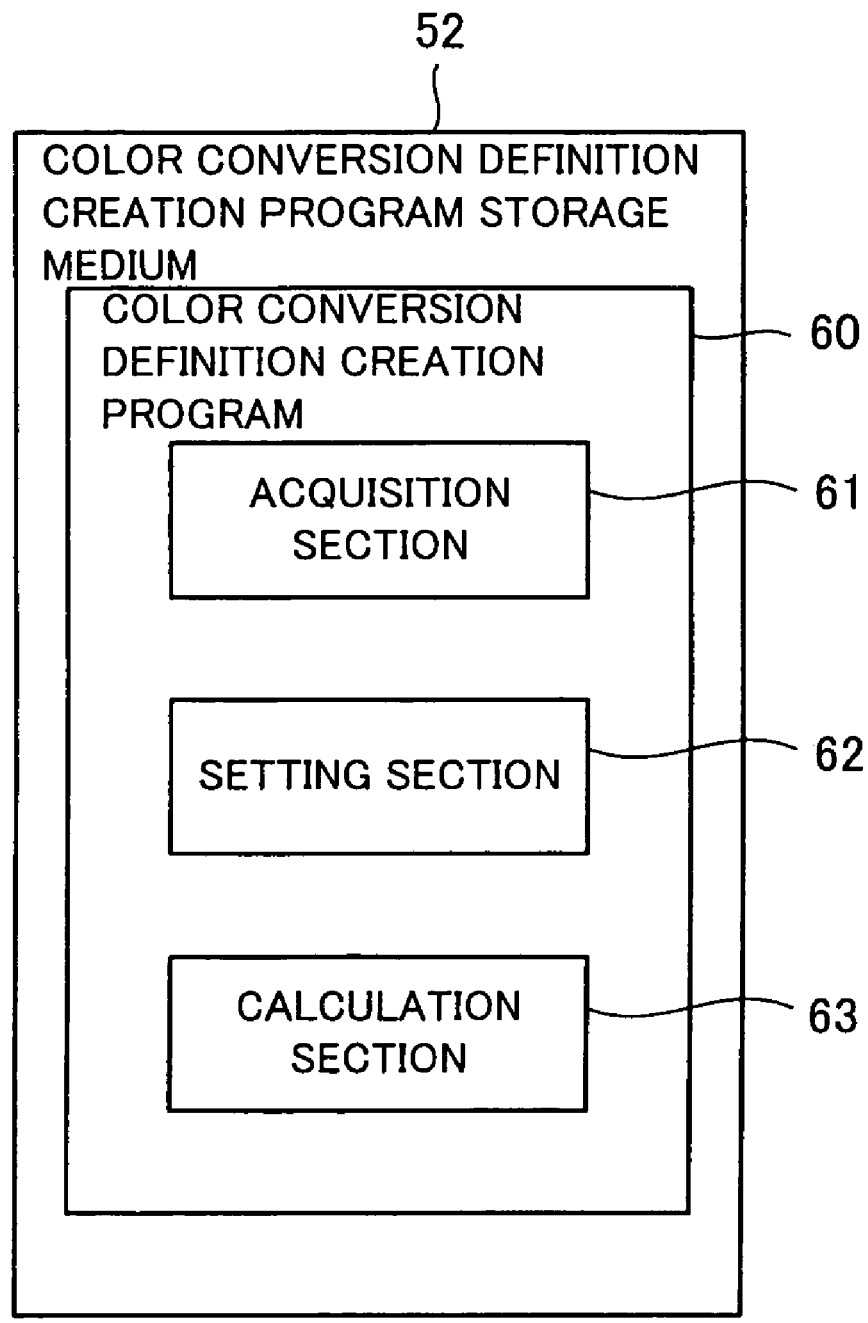
FIG. 9 shows an embodiment of a color conversion definition creation program storage medium of the present invention.

FIG. 9 shows a color conversion definition creation program stored in an embodiment of a color conversion definition creation program storage medium of the present invention. Here, the color conversion definition creation program 60 is stored in a storage medium 52 that is an embodiment of a color conversion definition creation program storage medium of the present invention.

The storage medium 52 shown in FIG. 9 may be of any kind only if the color conversion definition creation program 60 is stored therein. For example, if the color conversion definition creation program 60 is stored in a CD-ROM, the CD-ROM is the storage medium 52. If the color conversion definition creation program 60 is loaded and stored in a hard disk, the hard disk is the storage medium 52. If the color conversion definition creation program 60 is downloaded to a flexible disk, the flexible disk is the storage medium 52. In addition, the recording medium may be an MO disk or a DVD. Alternatively, it may be a card-type or tape-type recording medium.

The color conversion definition creation program 60 is executed in the personal computer 20 shown in FIG. 2, and causes the personal computer 20 to operate as a color conversion definition creation apparatus for creating color conversion definition (a profile). It has an acquisition section 61, a setting section 62 and a calculation section 63.

The acquisition section 61, the setting section 62 and the calculation section 63 have a role of causing the acquisition process (step S01), the setting process (step S02) and the calculation process (step S03) shown in FIG. 8 to be executed on the personal computer 20, respectively.

The details of each component of the color conversion definition creation program 60 will be described later.

Figure 10:
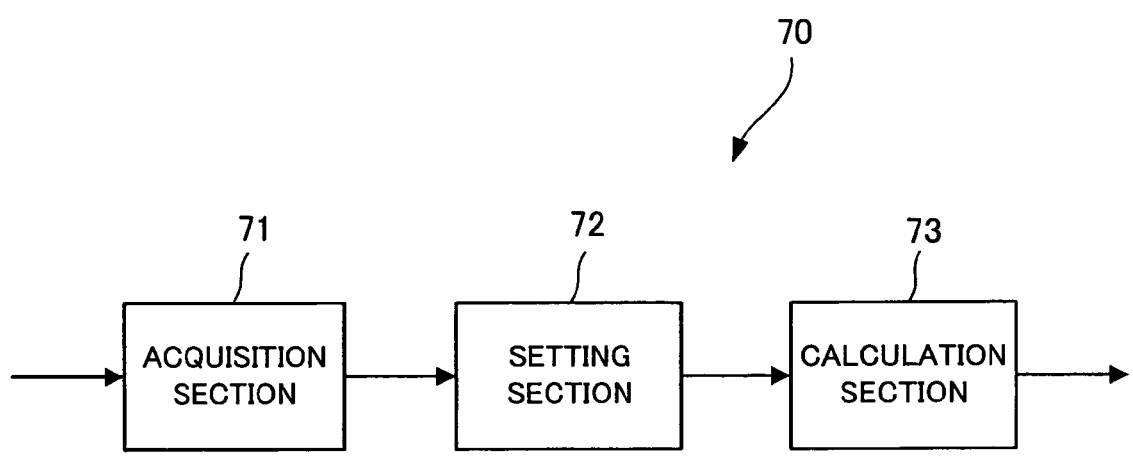
FIG. 10 is a functional block diagram of an embodiment of a color conversion definition creation apparatus of the present invention.

FIG. 10 is a functional block diagram of an embodiment of a color conversion definition creation apparatus of the present invention.

The color conversion definition creation apparatus 70 is configured by the color conversion definition creation program 60 in FIG. 9 being installed on the personal computer 20 shown in FIG. 2 and executed.

The color conversion definition creation apparatus 70 is configured by an acquisition section 71, a setting section 72 and a calculation section 73. The acquisition section 71, the setting section 72 and the calculation section 73 are constructed on the personal computer 20 by the acquisition section 61, the setting section 62 and the calculation section 63 constituting the color conversion definition creation program 60 shown in FIG. 9, respectively. Thus, each component of the color conversion definition creation apparatus 70 shown in FIG. 10 corresponds to each component of the color conversion definition creation program 60 shown in FIG. 9. However, each component in FIG. 10 is configured by combination of the hardware of the personal computer 20 shown in FIG. 2 and an OS or an application program to be executed on the personal computer, while each component shown in FIG. 9 is different in that it is configured only by an application program.

The acquisition section 71, the setting section 72 and the calculation section 73 correspond to an example of the acquisition section, the setting section and the calculation section of a color conversion definition creation apparatus of the present invention, respectively.

By describing each component of the color conversion definition creation apparatus 70 shown in FIG. 10, each step of the flowchart shown in FIG. 8 and each component of the color conversion definition creation program 60 shown in FIG. 9 are also described at the same time.

In the acquisition section 71 constituting the color conversion definition creation apparatus 70 in FIG. 10, CMY values are outputted to the color printer 30 shown in FIG. 2, and XYZ values are acquired from the spectrophotometer 40 via the cable 41 shown in FIG. 3 and the input/output interface 216 shown in FIG. 4. A CMY value and an XYZ value are combined for the same color patch by the acquisition section 71, and thereby a group of pairs of a coordinate in the CMY color space and a coordinate in the XYZ color space is obtained. As a CMY value to be outputted to the color printer 30, a combination of C, M and Y, each of which takes any value of 0, 10, 20, 40, 70 and 100%, is assumed to be used. As a profile, such that defines an XYZ value (a corresponding grid point) for each of all the grid points located at positions incremented by 10%, from 0% to 100%, for each of C, M and Y is assumed to be created.

As a method for calculating all corresponding grid points required for creation of a profile from data of corresponding grid points acquired only for a part of grid points among all grid points as described above, a method is adopted here in which a formula generally specifying mutual relation between corresponding grid points against mutual relation between grid points is prepared, and each corresponding grid point is calculated by solving the formula with the acquired data of the corresponding grid points as a boundary condition. In the present embodiment, by adopting the Laplace equation indicating an equilibrium condition in the field of the physical quantity as the general formula, a conditional expression is provided in which each of X, Y and Z is a continuous function for a CMY value. In such a calculation method, data required as a boundary condition is not required to be data corresponding to grid points, and therefore the position for setting a boundary condition is extremely freely changeable.

The following is the Laplace equation expressed in a finite difference form, where N is the number of grid portions divided by grid points in the CMY color space, and $U(c, m, y)$ ($U=X, Y, Z$) is the XYZ value at each grid point $(c, m, y)$ $(c, m, y=0, \ldots, N-1)$.

$$U(c, m, y) = \{U(c-1, m, y) + U(c+1, m, y) \quad (1)$$
$$U(c, m-1, y) + U(c, m+1, y)$$
$$U(c, m, y-1) + U(c, m, y+1)\}/6$$

By solving the formula (1) for all the grid points simultaneously, all the necessary XYZ values are obtained, but the number of used equations is too large. Therefore, solution by means of an iteration method such as the Gauss-Seidel iteration method is practical. As for an edge portion of the CMY cubic grid, a corresponding grid point is determined from an acquired grid point by means of interpolation, and as for a surface portion of the CMY cubic grid, a corresponding grid point is calculated by solving the two-dimensional Laplace equation with an edge portion and an acquired grid point as a boundary condition.

Figure 11:
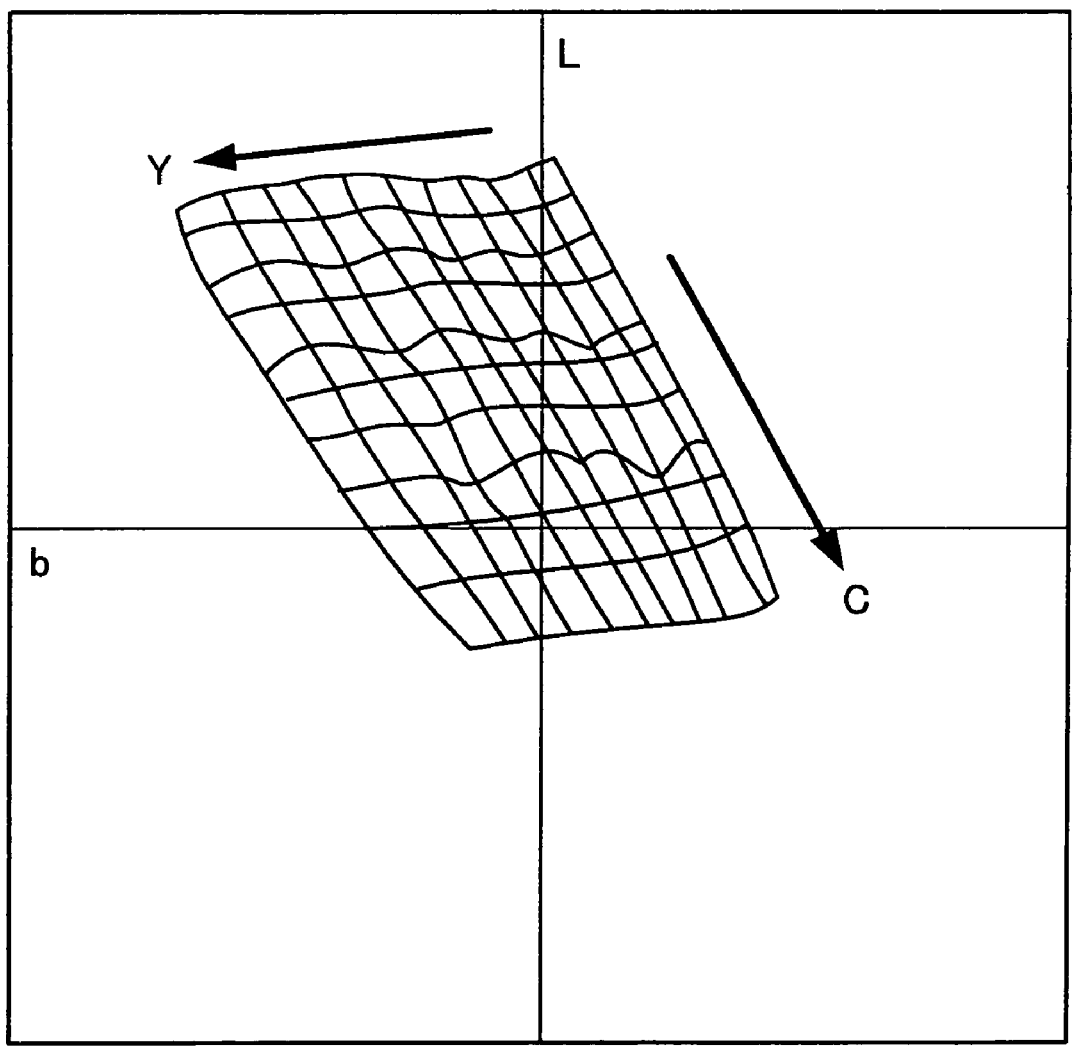
FIG. 11 is a graph showing solutions of a formula (1)

FIG. 11 is a graph showing the solutions of the formula (1).

In the graph of FIG. 11, the solutions of XYZ values converted to Lab values are shown, and the horizontal and vertical axes of the graph indicate b values and L values, respectively.

In this graph, solutions corresponding to the CY grid at M=40% are shown as a net. The upper corner of the graph indicates the solution for (C, Y)=(0, 0). The more left of the graph the position is, the more the Y value increases. The more lower right of the graph the position is, the more the C value increases.

As described above, the XYZ value (Lab values in this graph) for (C, Y)=(40, 20) or (C, Y)=(70, 40) is a fixed value under a boundary condition, and it is seen from the graph that the solutions around the fixed value are distorted. Such distorting may cause tone jump when color conversion is performed, and therefore the solutions shown in FIG. 11 can be regarded as inappropriate for creation of color conversion definition.

Thus, XYZ values acquired as solutions simply by setting a conditional expression and giving a boundary condition may be inappropriate. Therefore, in this embodiment, nonlinearity in the correspondence relation between the CMY color space and the XYZ color space is set via GUI (graphical user interface) and the like by operating the keyboard 23 or the mouse 24 shown in FIG. 3 at the setting section 72 shown in FIG. 10, and the nonlinearity is added to Laplace equation by the calculation section 73 to calculate appropriate solutions.

Figure 12:
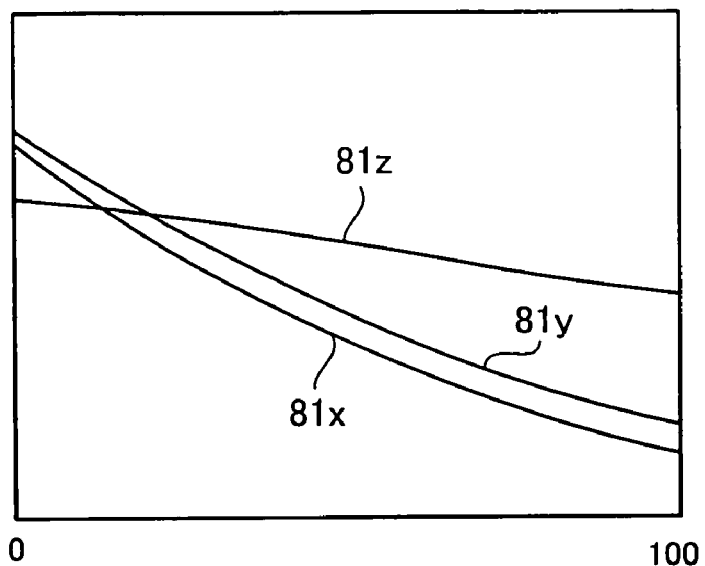
FIG. 12 is a first graph indicating an example of nonlinearity set by a setting section.
Figure 13:
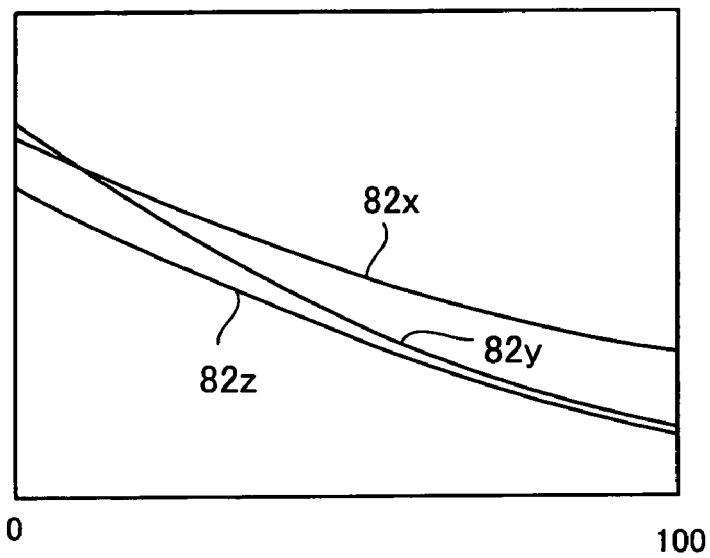
FIG. 13 is a second graph indicating an example of nonlinearity set by the setting section.
Figure 14:
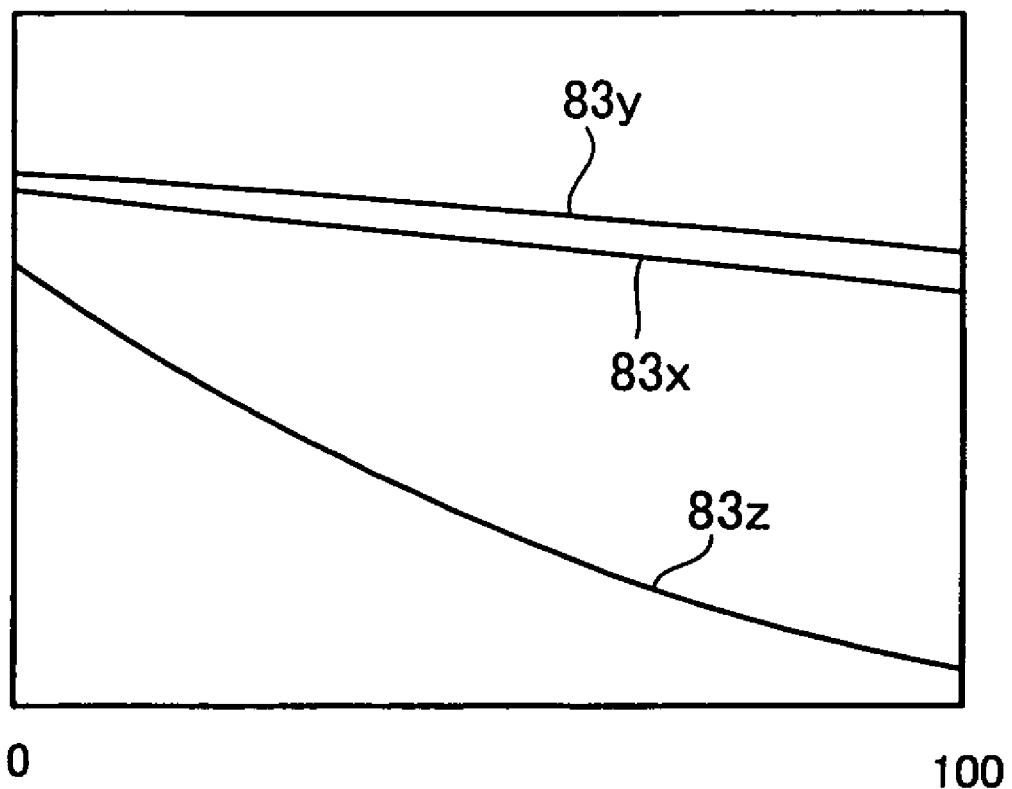
FIG. 14 is a third graph indicating an example of nonlinearity set by the setting section.

FIGS. 12 to 14 show graphs indicating an example of the nonlinearity set by the setting section.

The horizontal axis of FIG. 12 indicates C values. The horizontal axis of FIG. 13 indicates M values. The horizontal axis of FIG. 14 indicates Y values. The vertical axis of each figure indicates XYZ values. FIG. 12 shows three curves $81x$, $81y$ and $81z$ indicating change in X, Y and Z accompanying change in the dot % of the C monochrome, respectively. FIGS. 13 and 14 show three curves $82x$, $82y$ and $82z$, and $83x$, $83y$ and $83z$ indicating change in X, Y and Z accompanying change in the dot % of the M monochrome and the Y monochrome, respectively.

These curves have a shape with a convex downward and show nonlinearity between the CMY value and XYZ value. In the correspondence relation between the CMY value and the XYZ value, the same nonlinearity as indicated by these curves actually exists, and it is considered that such nonlinearity exists because the substantial dot % on which dot gain and the like are reflected has more linear correspondence relation with the XYZ value than the dot % of a CMY value to be outputted to a printer.

At the setting section 72 shown in FIG. 10, nonlinearity based on such nonlinearity that actually exists is set. At the calculation section 73, the nonlinearity is replaced with inequality of grid intervals and added to the Laplace equation. If the unequal grid intervals are expressed as $H$, $H_m$ and $H_y$, for example, the above formula (1) is changed into the following formula (2), where $U(c-1, m, y)$ and the like are abbreviated as $U_{c-1}$ and the like.

$$U_{cmy} = [1/\{1/(H_{c-1} \cdot H_c) + 1/(H_{m-1} \cdot H_m) + 1/(H_{y-1} \cdot H_y)\}] \times [\{1/ \quad (2)$$
$$(H_{c-1} + H_c)\} \cdot \{(U_{c-1}/H_{c-1}) + (U_{c+1}/H_c)\} +$$
$$\{1/(H_{m-1} + H_m)\} \cdot \{(U_{m-1}/H_{m-1}) + (U_{m+1}/H_m)\} +$$
$$\{1/(H_{y-1} + H_y)\} \cdot \{(U_{y-1}/H_{y-1}) + (U_{y+1}/H_y)\}]$$

By the formula (2) being solved in an iteration method by the calculation section 73 similarly to the case of the formula (1), appropriate solutions of the XYZ values are obtained.

Figure 15:
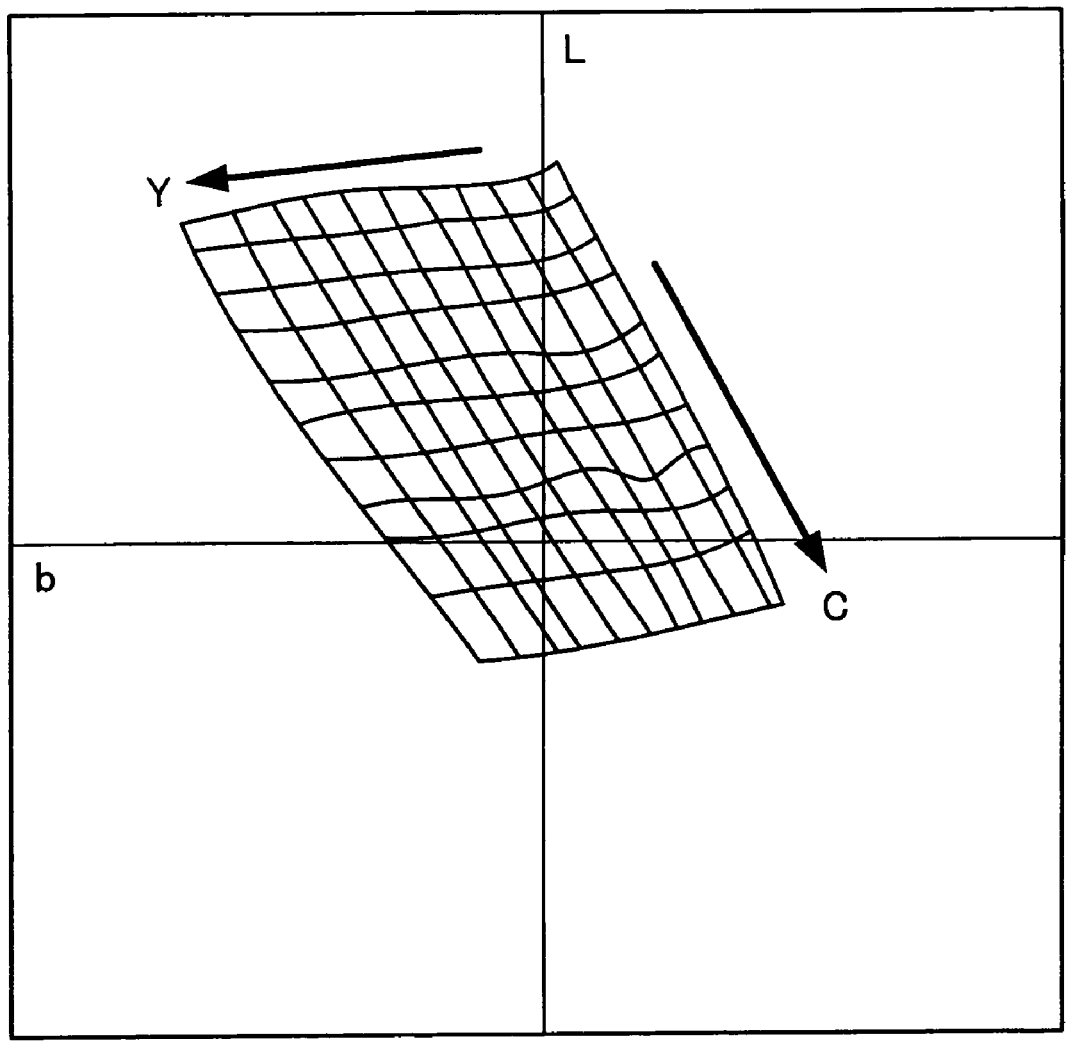
FIG. 15 is a graph showing solutions of a formula (2).

FIG. 15 is a graph showing the solutions of the formula (2).

In the graph of FIG. 15, the solutions of XYZ values converted to Lab values are shown the same as the graph of FIG. 11. The horizontal and vertical axes of the graph indicate b values and L values, respectively. In this graph also, solutions corresponding to the CY grid at M=40% are shown as a net. The upper corner of the graph indicates the solution for (C, Y)=(0, 0). The more left of the graph the position is, the more the Y value increases. The more lower right of the graph the position is, the more the C value increases.

The solutions shown in FIG. 15 are acquired in the quite same boundary condition under which the solutions shown in FIG. 11 are acquired. However, the distortion of the solutions is apparently improved, compared to the solutions shown in FIG. 11. As a result, color conversion based on a profile which is acquired from the solutions shown in FIG. 15 can be expected to be a favorable color conversion.

In the above description, a device color space of CMY is shown as an example of the first color space of the present invention, and a color space of XYZ is shown as an example of the second color space of the present invention. However, the first and second color spaces of the present invention may be the CMYK color space or the RGB color space. Alternatively, they may be the Lab color space, the Luv color space or the sRGB color space. Furthermore, both of the first and second color spaces may be device color spaces.

In the description above, there is shown a setting section which sets nonlinearity based on nonlinearity that actually exists, as an example of the setting section of the present invention. However, the setting section of the present invention may be such that sets nonlinearity that does not actually exist.

In the description above, there is shown an example in which the set nonlinearity is reflected on grid intervals. However, in the present invention, the nonlinearity may be reflected on the transmission speed.

What is claimed is:

1. A color conversion definition creation apparatus for creating a color conversion definition in which correspondence relation between coordinates in a first color space and coordinates in a second color space is defined, the apparatus comprising:
    an acquisition section which acquires a group of pairs of a coordinate in the first color space and a coordinate in the second color space;
    a setting section which sets nonlinearity in the correspondence relation between the coordinates in the first color space and the coordinates in the second color space; and
    a calculation section which solves a formula in which, for any two coordinates in the first color space, mutual relation between coordinates in the second color space corresponding to the coordinates in the first color space is generally specified, with the group of coordinate pairs acquired by the acquisition section as a boundary condition and with the nonlinearity set by the setting section added, to calculate each coordinate in the second color space corresponding to each coordinate in the first color space;
    a creation and output section which creates and outputs the color conversion definition by using the coordinate calculated in the calculation section.

2. The color conversion definition creation method apparatus according to claim 1, wherein said acquisition section acquires said group of pairs from a chart containing a plurality of patches having multiple colors in said first color space.

3. The color conversion definition creation apparatus according to claim 2, wherein said coordinate in the first color space and said coordinate in the second color space are combined for each patch of said plurality of patches.

4. The color conversion definition creation apparatus according to claim 1, wherein the first and second color spaces are device color spaces.

5. The color conversion definition creation apparatus according to claim 1, wherein said nonlinearity in the correspondence relation between the coordinates in the first color space and the coordinates in the second color space does not actually exist.

6. The color conversion definition creation apparatus according to claim 1, wherein an image in said first color space is converted to an image in said second color space using said color conversion definition.

7. A color conversion definition creation program storage medium storing a color conversion definition creation program to be incorporated in and executed by a computer, for causing the computer to create a color conversion definition in which correspondence relation between coordinates in the first space and coordinates in the second space is defined, the program configuring, on the computer:
    an acquisition section which acquires a group of pairs of a coordinate in the first color space and a coordinate in the second color space;
    a setting section which sets nonlinearity in the correspondence relation between the coordinates in the first color space and the coordinates in the second color space; and
    a calculation section which solves a formula in which, for any two coordinates in the first color space, mutual relation between coordinates in the second color space corresponding to the coordinates in the first color space is generally specified, with the group of coordinate pairs acquired by the acquisition section as a boundary condition and with the nonlinearity set by the setting section added, to calculate each coordinate in the second color space corresponding to each coordinate in the first color space;
    a creation and output section which creates and outputs the color conversion definition by using the coordinate calculated in the calculation section.

8. The color conversion definition creation program storage medium according to claim 7, wherein said acquisition section acquires said group of pairs from a chart containing a plurality of patches having multiple colors in said first color space.

9. The color conversion definition creation program storage medium according to claim 8, wherein said coordinate in the first color space and said coordinate in the second color space are combined for each patch of said plurality of patches.

10. The color conversion definition creation program storage medium according to claim 7, wherein the first and second color spaces are device color spaces.

11. The color conversion definition creation program storage medium according to claim 7, wherein said nonlinearity in the correspondence relation between the coordinates in the first color space and the coordinates in the second color space does not actually exist.

12. The color conversion definition creation program storage medium according to claim 7, wherein an image in said first color space is converted to an image in said second color space using said color conversion definition.

* * * * *